United States Patent
Sandelis

(10) Patent No.: US 9,175,856 B2
(45) Date of Patent: Nov. 3, 2015

(54) COMBUSTION CHAMBER FOR A TURBOMACHINE INCLUDING IMPROVED AIR INLETS

(75) Inventor: Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 916 days.

(21) Appl. No.: 13/388,345

(22) PCT Filed: Aug. 2, 2010

(86) PCT No.: PCT/EP2010/061180
§ 371 (c)(1),
(2), (4) Date: Feb. 1, 2012

(87) PCT Pub. No.: WO2011/015543
PCT Pub. Date: Feb. 10, 2011

(65) Prior Publication Data
US 2012/0137697 A1    Jun. 7, 2012

(30) Foreign Application Priority Data
Aug. 4, 2009  (FR) ...................................... 0955490

(51) Int. Cl.
F23R 3/06        (2006.01)
F23R 3/50        (2006.01)

(52) U.S. Cl.
CPC ... *F23R 3/06* (2013.01); *F23R 3/50* (2013.01); *Y02T 50/675* (2013.01)

(58) Field of Classification Search
CPC ..................................... F23R 3/06; F23R 3/50
USPC .................................................. 60/752–760
See application file for complete search history.

(56) References Cited

U.S. PATENT DOCUMENTS

| | | | |
|---|---|---|---|
| 2,543,755 A | | 3/1951 | Berger |
| 2,664,702 A | | 1/1954 | Lloyd et al. |
| 2,840,989 A | * | 7/1958 | Macaulay ...................... 60/756 |
| 3,671,171 A | * | 6/1972 | Doyle ............................. 60/758 |
| 4,132,066 A | * | 1/1979 | Austin et al. .................... 60/752 |
| 4,133,633 A | * | 1/1979 | Fehler et al. ................... 431/352 |
| 4,621,499 A | * | 11/1986 | Mori et al. ...................... 60/752 |
| 4,848,081 A | * | 7/1989 | Kennedy ......................... 60/766 |
| 5,009,070 A | * | 4/1991 | Iizuka et al. .................... 60/753 |

(Continued)

FOREIGN PATENT DOCUMENTS

| | | |
|---|---|---|
| DE | 29 32 318 | 2/1981 |
| EP | 2 065 644 A2 | 6/2009 |

(Continued)

OTHER PUBLICATIONS

Search Report issued Mar. 19, 2010 in French Application No. 0955490 (With English Translation of Category of Cited Documents).

*Primary Examiner* — Phutthiwat Wongwian
*Assistant Examiner* — Lorne Meade
(74) *Attorney, Agent, or Firm* — Oblon, McClelland, Maier & Neustadt, L.L.P.

(57) ABSTRACT

A combustion chamber for a turbomachine, including two coaxial walls including air inlets, each of which is configured such that its orthogonal projection, in a plane passing through the axis of the injection system closest to the inlet and perpendicular to an axial plane passing through this axis and through the axis of the combustion chamber, has an upstream edge of convex shape when seen from downstream.

8 Claims, 3 Drawing Sheets

(56) References Cited

U.S. PATENT DOCUMENTS

| | | | |
|---|---|---|---|
| 5,050,385 A * | 9/1991 | Hirose et al. | 60/757 |
| 5,289,686 A * | 3/1994 | Razdan et al. | 60/755 |
| 5,331,805 A * | 7/1994 | Myers et al. | 60/804 |
| 5,572,862 A * | 11/1996 | Mowill | 60/39.23 |
| 6,105,371 A | 8/2000 | Ansart et al. | |
| 6,675,587 B2 * | 1/2004 | Graves et al. | 60/804 |
| 7,328,582 B2 | 2/2008 | Sandelis et al. | |
| 7,891,194 B2 | 2/2011 | Biebel et al. | |
| 7,942,005 B2 * | 5/2011 | Bessagnet et al. | 60/752 |
| 7,954,327 B2 | 6/2011 | Pieussergues et al. | |
| 8,215,118 B2 * | 7/2012 | Pieussergues et al. | 60/804 |
| 8,739,546 B2 * | 6/2014 | Snyder et al. | 60/752 |
| 2002/0189260 A1 | 12/2002 | David et al. | |
| 2007/0193248 A1 * | 8/2007 | Bessagnet et al. | 60/39.01 |
| 2009/0139239 A1 | 6/2009 | Zupanc et al. | |

FOREIGN PATENT DOCUMENTS

| | | |
|---|---|---|
| FR | 1037635 | 9/1953 |
| GB | 685068 | 12/1952 |
| JP | 54-49409 | 4/1979 |
| JP | 60-194234 | 10/1985 |

* cited by examiner

COMBUSTION CHAMBER FOR A TURBOMACHINE INCLUDING IMPROVED AIR INLETS

TECHNICAL FIELD

The present invention relates to the field of turbomachines, such as aircraft turbomachines, and concerns more specifically annular combustion chambers of turbomachines.

STATE OF THE PRIOR ART

Turbomachines include at least one turbine positioned at the outlet of a combustion chamber to extract energy from a primary flow of gases injected by this combustion chamber, and to drive a compressor positioned upstream of the combustion chamber, and supplying this chamber with pressurised air.

Combustion chambers of turbomachines typically include two coaxial annular walls, which are respectively radially internal and radially external, which extend from upstream to downstream, in the direction of flow of the primary gas flow in the turbomachine, around the axis of the combustion chamber, and which are connected to one another at their upstream end by an annular end wall at the back of the chamber which extends roughly radially around the abovementioned axis. This annular end wall is fitted with an annular row of injection systems which are regularly distributed around this axis to allow air and fuel to be introduced into the combustion chamber.

Each injection system generally includes means of support of a fuel injector head fitted with aerodynamic means for injection of air and for vaporisation of the fuel in the form of fine droplets in the combustion chamber.

In operation, an injection system of this type typically generates a layer of a blend of air and fuel having a general tapered shape around a central axis of the injection system. The maximum fuel concentration is more particularly located in a truncated cone, the apex of which is located roughly at the entrance of the injection system and having a half cone angle of between approximately 30 and 40 degrees. The profile of the layer is roughly constant at normal operating engine speeds from the low engine speed to the full-throttle speed.

Combustion chambers are generally divided into an upstream internal region, commonly called the primary zone, and a downstream internal region, commonly called the dilution zone.

The primary zone of a combustion chamber is designed for the combustion of the air-fuel blend in roughly stoichiometric proportions. To this end, the air is injected into this zone not only by the injection systems but also by first inlets, commonly called primary inlets, made in the annular walls of the chamber around the latter's primary zone.

The dilution zone is designed to dilute and cool the gases resulting from the combustion in the primary zone, and to give the flow of these gases an optimum thermal profile for the purpose of passing it into the turbine assembled downstream of the combustion chamber. To do so, the annular walls of the combustion chamber include second air inlets, commonly called dilution inlets.

The properties of combustion chambers notably depend on the quality of the combustion in the primary zone of these chambers.

And in combustion chambers of known types, the air-fuel blend generally remains in the primary zone for a time which is not long enough to allow complete combustion.

In addition, the temperature profile of the combustion gases being expelled from these combustion chambers is not sufficiently uniform to allow optimum operation of the turbines associated with these combustion chambers. This results notably from the non-uniformity of the fuel concentration in the primary zone of these chambers.

DESCRIPTION OF THE INVENTION

One aim of the invention is notably to provide a simple, economic and efficient solution to these problems.

To this end it proposes a combustion chamber for a turbomachine, including an annular end wall fitted with injection systems regularly distributed around a longitudinal axis of the combustion chamber, each of which has a central fuel emission axis, where the combustion chamber also includes two coaxial annular walls, which are respectively internal and external, connected to one another by the end wall, and including multiple air inlets formed on at least one of these annular walls and opening radially towards the outside relative to the axis of the combustion chamber. According to the invention, the multiple air inlets include inlets of a first type shaped such that the orthogonal projection of each of these inlets in a corresponding projection plane, which passes through the central axis of the injection system closest to the inlet, and which is perpendicular to a corresponding axial plane passing jointly through this central axis and through the longitudinal axis of the combustion chamber, has an upstream edge which is convex in shape when seen from downstream.

The shape of the air inlets of the first type enables the upstream front of the flow of injected air to be given by these inlets a roughly concave profile, seen from upstream, which enables a reflecting barrier effect to be caused with regard to the gases flowing from upstream to downstream in the combustion chamber.

This enables phenomena of recirculation of these gases to be favoured, which are such that they improve the combustion reactions occurring in the combustion chamber, and therefore the properties of the latter, and also such that they enable the temperature of the gases being expelled from this combustion chamber to be made more uniform.

In addition, this can make it possible to reduce the number and/or overall area of the air inlets of the coaxial walls of the combustion chamber.

In what follows each air inlet is associated with the injection system closest to this inlet or, if it is equidistant between two such, with both injection systems closest to the said inlet.

In a preferred embodiment of the invention, the upstream edge of the orthogonal projection of each of the inlets of the first type has a half-ellipse shape. This upstream edge may in particular have the shape of a half-circle.

As a variant, this upstream edge may have the shape of a polygonal line.

The inlets of the first type are preferably shaped such that the orthogonal projection of each of these inlets also has a downstream edge which is convex in shape when seen from downstream.

This enables the area of the inlets to be reduced, and therefore the flow of air injected by them to be concentrated, without appreciably reducing the reflecting barrier effect caused by this airflow. This results in a more efficient use of the air injected by these inlets.

In the preferred embodiment of the invention the abovementioned downstream edge has a half-ellipse shape. Like the upstream edge, this edge may in particular have the shape of a half-circle.

As a variant, this upstream edge may also have the shape of a polygonal line.

In the preferred embodiment of the invention the upstream and downstream edges of the projection of each of the inlets of the first type are concentric.

The inlets of the first type advantageously include primary inlets formed around an upstream region of the combustion chamber, commonly called the primary zone.

By causing a reflecting barrier effect, as explained above, these primary inlets allow recirculation of the air-fuel blend in the primary zone of the combustion chamber to be favoured, and thus allow the combustion reactions of this blend to be improved considerably.

There are preferably two such primary inlets associated with each injection system, and they are preferably positioned symmetrically relative to the corresponding axial plane.

In the preferred embodiment of the invention, and in a manner known in the art, each of the injection systems is configured to emit a layer of blended fuel and air having a region of maximum fuel concentration roughly located in a truncated right circular cone centred on the central axis of the injection system, and having an apex located at the entrance of this injection system.

The shape of the layer of air-fuel blend associated with each injection system may be determined experimentally by well-known techniques such as particle analysis by the Phase Doppler method, commonly called PDPA (Phase Doppler Particle Analysis). At the design stage of a combustion chamber according to the invention, the shape of the layer for a given combustion chamber geometry can also be determined by digital simulation methods, which are also well-known to the skilled man in the art.

The orthogonal projection of each of the primary inlets of the first type in the corresponding projection plane is preferentially intercepted by a corresponding straight line resulting from the intersection of the abovementioned truncated cone with this projection plane.

In this manner, the flow of air injected by each of these inlets can intercept the region of maximum fuel concentration of the corresponding layer whilst flowing roughly tangentially to this region of the layer, such that the reflecting barrier effect produced by this airflow can be made more efficient.

The orthogonal projection of each of the primary inlets of the first type in the corresponding projection plane preferably has an axis of symmetry which, with the corresponding straight line resulting from the intersection of the truncated cone with the projection plane, forms an angle of between −5 degrees and 5 degrees.

The barrier formed by the air injected by each of these inlets is thus aligned roughly perpendicularly with the local flow direction of the air-fuel layer originating from the corresponding injection system, and by this means favours recirculation of the air-fuel blend roughly in a direction opposite to this local flow direction.

In the preferred embodiment of the invention, the axis of symmetry of the orthogonal projection of each of the primary inlets of the first type in the corresponding projection plane roughly coincides with the corresponding straight line which results from the intersection of the said truncated cone with this projection plane.

This positioning of these inlets enables the airflow injected by them to flow as close as possible to the region of maximum fuel concentration of the corresponding layer, so as to maximise the efficiency of the reflecting barrier effect produced by this airflow.

In the preferred embodiment of the invention, the primary inlets of the combustion chamber are all inlets of the first type.

As a variant, these primary inlets may include a set of inlets of the first type and of inlets of a conventional type.

In addition, the multiple air inlets advantageously include dilution inlets formed around a downstream region of the combustion chamber, commonly called the dilution zone, and some at least of which are inlets of a second type having a lengthened shape in a direction perpendicular to the longitudinal axis of the combustion chamber.

The lengthened shape of the dilution inlets of the second type allows an improvement of the efficiency and uniformity of the cooling of the gases in the dilution zone due to the air injected into this zone by these inlets.

The dilution inlets of the second type can also cause a barrier effect with regard to these gases, possibly against a portion of these gases which have bypassed the air injected by any primary inlets in the primary zone of the combustion chamber, so as to slow the flow of these gases.

Additionally, or as a variant, the dilution inlets may include inlets of the first type as described above, and/or inlets of a conventional type.

The invention also concerns a turbomachine including a combustion chamber of the type described above.

BRIEF DESCRIPTION OF THE ILLUSTRATIONS

The invention will be better understood, and other details, advantages and characteristics of it will appear, on reading the following description given as a non-restrictive example, and with reference to the appended illustrations, in which.

DETAILED DESCRIPTION OF A PREFERRED EMBODIMENT

Figure 1:
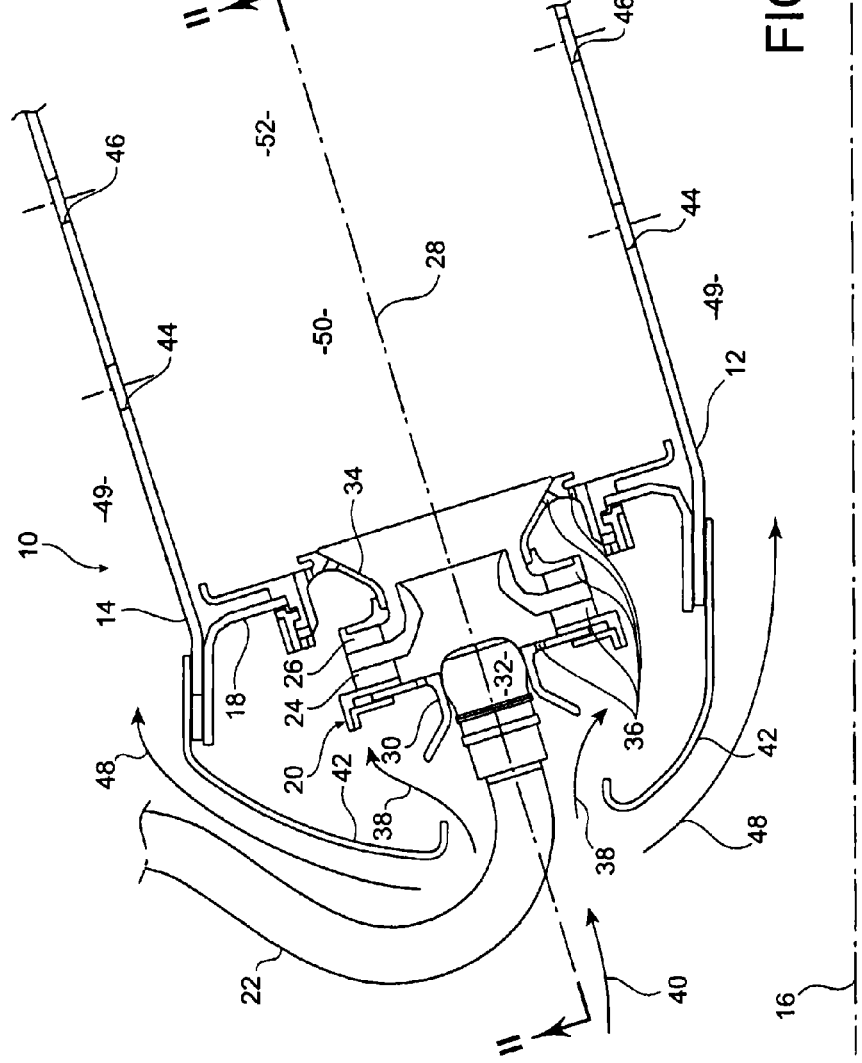
FIG. 1 is a schematic axial section half-view of a combustion chamber in a turbomachine according to the invention.

FIG. 1 represents a portion of a turbomachine, such as an aircraft turbojet, and more particularly illustrates a portion of an annular combustion chamber 10 of this turbomachine.

In a well-known manner, combustion chamber 10 is assembled downstream of a compressor of the turbomachine intended to supply this chamber with pressurised air, and upstream of a turbine of this turbomachine, intended to rotate the abovementioned compressor under the effect of the thrust of the gases from the combustion chamber, this compressor and this turbine not being represented in FIG. 1.

Combustion chamber 10 includes two coaxial annular walls, which are respectively radially internal and radially external 14, and which extend around longitudinal axis 16 of the combustion chamber.

Both these annular walls 12 and 14 are attached downstream to casings of the chamber (not visible in FIG. 1), and are connected to one another at their upstream ends by an annular end wall 18, in a known manner.

Annular end wall 18 includes an annular row of inlets regularly distributed around axis 16 of the combustion chamber, and in which are assembled injection systems 20 associated with an annular row of fuel injectors 22.

Each injection system 20 includes two swirl-inducers 24 and 26 which extend coaxially around axis 28 of the injection system, and which are connected upstream to means 30 for centring and guiding a head 32 of corresponding injector 22, and downstream to a swirler cup 34 assembled in the corresponding inlet of end wall 18.

Each injection system 20 includes in the areas of its swirl-inducers 24 and 26, its means 30 for centring and guiding the injector head, and its swirler cup 34, inlets 36 intended to inject, into the combustion chamber, a proportion 38 of airflow 40 from the compressor of the turbomachine.

Figure 2:
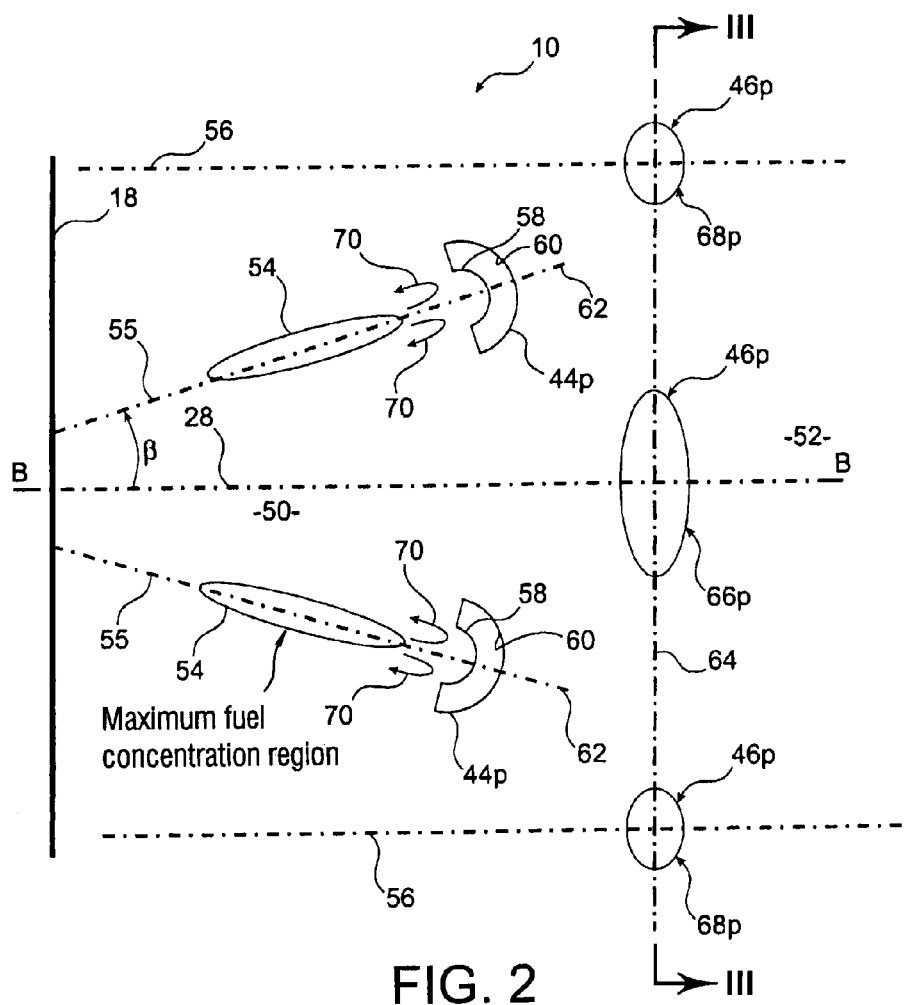
FIG. 2 is a partial schematic view, as a projection orthogonal to plane A-A of FIG. 1, of the combustion chamber of this FIG. 1.

As will appear more clearly in the explanations which follow with reference to FIG. 2, each injection system 20 is designed to spray into the combustion chamber a blend of air and fine droplets of fuel in the form of a layer of general tapered shape, having in particular a region of maximum fuel concentration located roughly in a truncated cone centred on axis 28 of the injection system, the apex of which is located roughly in the area of the entrance to this injection system, and of half cone angle β equal, for example, to approximately 35 degrees and typically between 30 and 40 degrees.

In addition, annular walls 12 and 14 of the combustion chamber are connected at their upstream end to an annular fairing 42 (FIG. 1) which is, for example, of the integral type, including inlets aligned with injection systems 20 for passage of injectors 22 and of airflow 38. The principal functions of this fairing are to protect end wall 18 and to channel airflow 38. As a variant, and in a known manner, this fairing 42 may be formed from two separate portions, which are respectively radially internal and radially external.

Each of annular walls 12 and 14 also includes two annular rows of air inlets 44 and 46 radially open towards the outside relative to axis 16 of the combustion chamber, and intended to inject a portion 48 of airflow 40 into this combustion chamber. In operation, this portion 48 of airflow 40 may reach air inlets 44 and 46 by flowing downstream into an annular bypass space 49 created between annular walls 12 and 14 of the combustion chamber, firstly, and the corresponding casings of this chamber (not visible in FIG. 1), secondly.

The first of these rows of inlets is formed around an upstream region 50 of the combustion chamber commonly called the primary zone, in which, in operation, the combustion reactions of the air-fuel blend occur. Inlets 44 of this first row are for this reason commonly called primary inlets.

The second row of inlets is formed downstream, around a region 52 of the chamber commonly called the dilution zone, in which the combustion gases are diluted and cooled. Inlets 46 of this second row are for this reason commonly called dilution inlets.

FIG. 2 represents air inlets of external annular wall 14, together with region 54 of maximum fuel concentration of the layer produced by an injection system 20 and truncated cone 55 on which this region 54 is roughly located, as an orthogonal projection in plane A-A of FIG. 1, which passes through axis 28 of injection system 20, and which is perpendicular to the plane of FIG. 1, i.e. to the axial plane passing through axis 28 of the abovementioned injection system, and through axis 16 of the combustion chamber, the latter plane being symbolised by line B-B in FIG. 2, and the projections of the primary and dilution inlets are designated respectively by references 44p and 46p in this figure. It should be noted that plane A-A of FIG. 1 is associated with injection system 20 represented in this figure.

Figure 3:
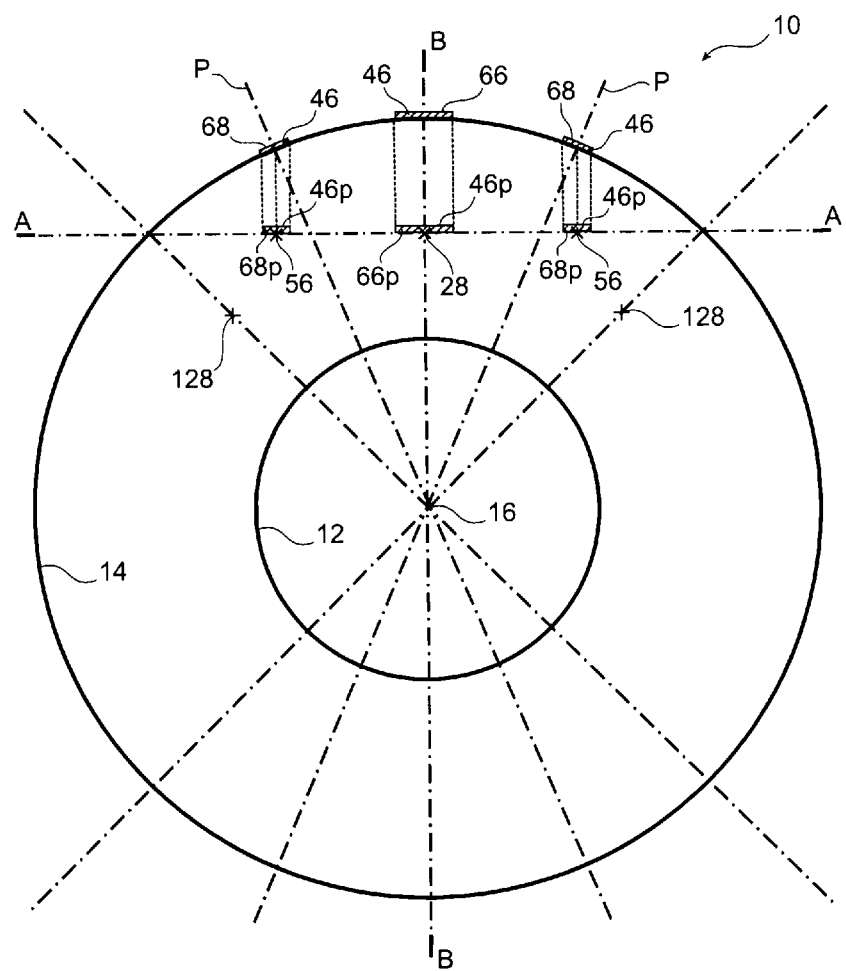
FIG. 3 is a partial schematic transverse section view of the combustion chamber of FIG. 1, in plane C-C of FIG. 2.

FIG. 3 illustrates the orthogonal projection in plane A-A of two dilution inlets 46 of external wall 14.

In addition, as this FIG. 3 more particularly shows, each of the two straight lines 56 visible in FIGS. 2 and 3 represents the projection in plane A-A of the intersection of external annular wall of the combustion chamber with a plane P which passes through axis 16 of this combustion chamber and which is positioned angularly halfway between axis 28 of injection system 20 and axis 128 of one of the two directly consecutive injection systems of this injection system 20 on end wall 18.

Air inlets 44 and 46, the respective projections of which, 44p and 46p, in plane A-A are positioned between the two axes 56, can therefore be associated with injection system 20 which constitutes the injection system closest to these inlets (FIG. 2).

There are two primary inlets 44 associated with injection system 20, and these are inlets of a first type, the orthogonal projection of which 44p in plane A-A presents an upstream edge 58 and a downstream edge 60, which are convex in shape when seen from downstream.

More specifically, this upstream edge 58 and downstream edge 60 each have the shape of a half-circle and are positioned concentrically, such that projection 44p of each primary inlet 44 has an axis of symmetry merged with a corresponding straight line 62, resulting from the intersection of truncated cone 55 with projection plane A-A.

Dilution inlets 46 associated with injection system 20 are inlets of a second type which have a lengthened shape in a direction 64 perpendicular to axis 28 of injection system 20.

These dilution inlets 46 include an inlet 66, the projection of which 66p in plane A-A is centred on axis 28 of injection system 20, and which thus forms a principal dilution inlet associated with this injection system 20, and also two secondary dilution inlets 68, the projections of which 68p in plane A-A are centred on the axes 56, and which are therefore positioned equidistantly from two consecutive injection systems of end wall 18.

The plane of symmetry of principal dilution inlet 66 is plane B-B, whereas secondary dilution inlets 68 have as their respective planes of symmetry axial planes P located angularly halfway between respective axes 28 and 128 of two consecutive injection systems (FIG. 3).

Since secondary dilution inlets 68 are located equidistantly from both consecutive injection systems of end wall 18, as explained above, it should be noted that each of these inlets is associated with both corresponding injection systems.

In the preferred embodiment of the invention the air inlets of internal annular wall 12 are configured in the same manner as the inlets of external wall 14.

In operation, as a consequence of their shape, primary inlets 44 allow a reflecting barrier effect to be caused, which is particularly efficient with regard to the air-fuel blend flowing downstream inside primary zone 50 of the combustion chamber, enabling phenomena of upstream recirculation of this blend to be favoured, as illustrated by means of arrows 70 in FIG. 2.

Dilution inlets 46 allow efficient and uniform cooling of the gases originating from primary zone 50.

The invention enables the properties of the combustion chamber to be improved generally, as has been explained above.

The invention claimed is:

1. A combustion chamber for a turbomachine, comprising:
an annular end wall fitted with injection systems regularly distributed around a longitudinal axis of the combustion chamber, each of the injection systems has a central fuel emission axis;
two coaxial annular walls, which are respectively internal and external, connected to one another by the end wall and including multiple air inlets formed on at least one of the two coaxial annular walls and the multiple air inlets open radially towards an outside relative to the longitudinal axis of the combustion chamber, wherein the multiple air inlets include inlets of a first type shaped such that an orthogonal projection of each of the air inlets of the first type in a corresponding projection plane, which passes through the central fuel emission axis of the injection system closest to the air inlet of the first type, and which is perpendicular to a corresponding axial plane passing jointly through the central fuel emission axis and through the longitudinal axis of the combustion chamber, has an upstream edge which is of convex shape when seen from downstream, wherein the air inlets of the first type include primary inlets formed around an upstream region of the combustion chamber, and wherein each of the injection systems is configured to emit a layer of blended fuel and air having a region of maximum fuel concentration located roughly on a truncated right circular cone centered on the central axis of the injection system, and having an apex located at an exit of the injection system, and the orthogonal projection of each of the primary inlets of the first type in the corresponding axial projection plane is intercepted by a corresponding straight line resulting from the intersection of the corresponding truncated cone with the corresponding axial projection plane.

2. A combustion chamber according to claim 1, wherein the upstream edge of the orthogonal projection of each of the air inlets of the first type has a half-ellipse shape.

3. A combustion chamber according to claim 1, wherein the air inlets of the first type are shaped such that the orthogonal projection of each of air inlets of the first type also has a downstream edge which is of convex shape when seen from downstream.

4. A combustion chamber according to claim 3, wherein the downstream edge of the orthogonal projection of each of the air inlets of the first type has a half-ellipse shape.

5. A combustion chamber according to claim 1, wherein the orthogonal projection of each of the primary inlets of the first type in the corresponding axial projection plane has an axis of symmetry forming, with the corresponding straight line resulting from the intersection of the truncated cone with the corresponding axial projection plane, an angle of between −5 degrees and 5 degrees.

6. A combustion chamber according to claim 5, wherein the axis of symmetry of the orthogonal projection of each of the primary inlets of the first type in the corresponding projection plane coincides roughly with the corresponding straight line resulting from the intersection of the truncated cone with the projection plane.

7. A combustion chamber according to claim 1, wherein the multiple air inlets include dilution inlets formed around a region downstream of the combustion chamber, some of which at least are inlets of a second type having a lengthened shape in a direction perpendicular to the longitudinal axis of the combustion chamber.

8. A turbomachine, comprising a combustion chamber according to claim 1.

* * * * *